United States Patent
Koulakiotis et al.

(10) Patent No.: US 7,031,694 B2
(45) Date of Patent: Apr. 18, 2006

(54) METHOD AND SYSTEM FOR PROVIDING A SERVICE

(75) Inventors: Dimitris Koulakiotis, London (GB); Sinikka Sarkkinen, Kangasala (FI)

(73) Assignee: Nokia Corporation, Espoo (FI)

( * ) Notice: Subject to any disclaimer, the term of this patent is extended or adjusted under 35 U.S.C. 154(b) by 27 days.

(21) Appl. No.: 10/287,800

(22) Filed: Nov. 5, 2002

(65) Prior Publication Data

US 2003/0104801 A1 Jun. 5, 2003

(30) Foreign Application Priority Data

Nov. 5, 2001 (GB) .................................. 0126516

(51) Int. Cl.
*H04M 11/00* (2006.01)
*H04Q 7/20* (2006.01)
(52) U.S. Cl. .................. 455/406; 455/408; 455/422.1; 455/456.3; 455/466
(58) Field of Classification Search ............ 455/2.01, 455/3.01, 3.02, 3.03, 3.04, 403, 406, 407, 455/408, 410, 414.1, 414.3, 414.4, 418, 422.1, 455/425
See application file for complete search history.

(56) References Cited

U.S. PATENT DOCUMENTS

| | | | | |
|---|---|---|---|---|
| 5,247,575 A | * | 9/1993 | Sprague et al. ................ 705/53 |
| 5,790,952 A | * | 8/1998 | Seazholtz et al. ......... 455/432.1 |
| 5,802,468 A | * | 9/1998 | Gallant et al. ............ 455/422.1 |
| 5,884,140 A | * | 3/1999 | Ishizaki et al. ............. 455/2.01 |
| 5,933,425 A | * | 8/1999 | Iwata .......................... 370/351 |
| 5,946,670 A | * | 8/1999 | Motohashi et al. .......... 705/400 |
| 6,041,124 A | * | 3/2000 | Sugita ......................... 380/270 |
| 6,104,709 A |   | 8/2000 | Rinchiuso et al. .......... 370/335 |
| 6,243,450 B1 | * | 6/2001 | Jansen et al. ........... 379/144.01 |
| 6,311,054 B1 | * | 10/2001 | Korpela ...................... 455/406 |
| 6,381,513 B1 | * | 4/2002 | Takase et al. ................ 700/231 |
| 6,411,803 B1 | * | 6/2002 | Malackowski et al. ..... 455/406 |
| 6,507,727 B1 | * | 1/2003 | Henrick ..................... 455/3.06 |
| 6,587,877 B1 | * | 7/2003 | Douglis et al. ............. 709/224 |
| 6,628,928 B1 | * | 9/2003 | Crosby et al. ................ 455/77 |
| 6,732,366 B1 | * | 5/2004 | Russo ............................ 725/5 |
| 6,757,529 B1 | * | 6/2004 | Nakajima ................... 455/407 |
| 6,862,444 B1 | * | 3/2005 | Karaoguz et al. ........... 455/408 |
| 2001/0009855 A1 |   | 7/2001 | l'Anson ...................... 455/445 |
| 2003/0153330 A1 | * | 8/2003 | Naghian et al. ............. 455/456 |

FOREIGN PATENT DOCUMENTS

| | | |
|---|---|---|
| EP | 1 006 740 A2 | 6/2000 |
| GB | 2 265 522 A | 9/1993 |
| WO | WO 02/15607 A2 | 2/2002 |
| WO | WO 02/015607 A3 | 2/2002 |

* cited by examiner

*Primary Examiner*—Binh K. Tieu
(74) *Attorney, Agent, or Firm*—Squire, Sanders & Dempsey L.L.P.

(57) ABSTRACT

The invention is directed to a method for providing a service to a user comprising the steps of defining an area in which the service is available, transmitting information to a plurality of users in the said area at the same time via a common channel to determine if the user is in the said area. If the user is in the said area, the user is arranged to receive the information transmitted on the common channel, and if the user is outside the said area, the user is provided with the option of receiving the information via a dedicated channel or the option of not receiving the information. The user is charged for the information received via the common channel in dependence with the selected option.

42 Claims, 2 Drawing Sheets

METHOD AND SYSTEM FOR PROVIDING A SERVICE

FIELD OF THE INVENTION

The present invention relates to a method and system for providing a service and in particular but not exclusively to the charging for a multicast service.

BACKGROUND OF THE INVENTION

A communication system is arranged for the provision of communication connections between two or more entities such as user terminal equipment and/or other nodes associated with the system. One of these entities may be a service provider. The communication system may comprise, for example, communication of voice, electronic mail and text messages, multimedia messages, data and so on.

The communication system may use a wireless interface for the user terminals. An example of a system using wireless communication is a public land mobile network (PLMN). A communication system typically operates in accordance with a given standard specification which sets out what the various elements of the system are permitted to do and how that should be achieved. For example, the standard specification may define if the user equipment or terminal is provided with a circuit switch (CS) service or a packet switched (PS) service or both. Communication protocols and/or parameters which need to be used for the communication are also typically defined. For example, the manner in which communication is implemented between the user and the elements of the communication network is usually based on a predetermined communication protocol.

Examples of the different standards and/or specifications for wireless communications include GSM (global system for mobile communications), AMPS. (American mobile phone system), DAMPS (digital amps) various GSM based systems such as GPRS (general packet radio service) as well as so-called third generation standards including cdma2000 (code division multiple access2000), UMTS (universal mobile telecommunication system), IMT2000 (international mobile telecommunication system 2000) and so on.

In known wireless cellular communication systems, the area covered by the network is divided into cells which may or may not be overlapping. Associated with each cell is a base station which is arranged to communicate with mobile stations or other suitable user equipment in the cell associated with a base station. In some standards, the base station is referred to as a node B. However, in this document, the term base station will be used to refer to all such entities.

The base station is connected to and controlled by a controller entity. For example, in the UMTS network a base station is connected to and controlled by a node referred to as a Radio Network Controller (RNC). Again, similar nodes may be provided in different standards and may be referred to by different terms. In this document, the term radio network controller is intended to cover all such systems. The RNC node may in turn be connected to and controlled by a mobile switching centre (MSC), a serving GPRS support node (SGSN) or similar facility.

As part of the third generation standard, a new service called the multicast broadcast multimedia service (MBMS) has been proposed. This is a unidirectional point-to-multipoint service in which data is transmitted from a single source entity to a group of users in a specific area. The MBMS has two modes: the broadcast mode and the multicast mode. When using MBMS, all group members in an area may receive the same data over a common radio channel.

SUMMARY OF THE INVENTION

It is an aim of some embodiments of the present invention to address problems concerned with charging relating, for example, to the MBMS service. However, it should be emphasised that embodiments of the present invention are not limited to application with respect to the MBMS service.

According to one aspect of the invention, there is provided a method for providing a service to a user comprising the steps of:
  defining an area in which said service is available;
  transmitting information to a plurality of users in said area at the same time via a common channel;
  determining if the user is in said area and if said user is in said area, said user being arranged to receive said information transmitted on said common channel, wherein if said user is outside said area, said user being provided with the option of receiving said information via a dedicated channel or the option of not receiving said information, said user being charged for the information received via the common channel in dependence with the selected option.

According to a further aspect of the invention, there is provided a method of providing a service to a user comprising the steps of:
  transmitting information to said user;
  determining the amount of information received by said user; and
  charging said user in dependence on the amount of information received by said user.

According to a further aspect of the invention, there is provided a method of providing a service to a user comprising the steps of:
  paying in advance to receive a predetermined amount of information;
  transmitting information to a user;
  preventing said user from receiving any further information when said user has received said predetermined amount of information.

According to a further aspect of the invention, there is provided a method of providing a service to a user comprising the steps of:
  subscribing to receive information in accordance with said service, for a predetermined time;
  transmitting information to a user; and
  preventing said user from receiving information outside said predetermined time.

According to a further aspect of the invention, there is provided a method of providing a service to a user comprising the steps of:
  subscribing to receive information with one of at least two different quality of service;
  transmitting substantially the same information with each of said different qualities of service; and
  receiving said information at said user with the quality of service for which the user has subscribed.

According to a further aspect of the invention, there is provided a telecommunications system in which a service is provided to at least one user, said network comprising:
  a first area in which said service is available and a second area in which said area is not available;

means for determining if a user is in said first area or said second area;

means for transmitting information to a plurality of users in said first area at the same time via a common channel, wherein if said user is outside said area, said user being provided with the option of receiving said information via a dedicated channel or the option of not receiving said information; and charging means arranged to charge said user for the information receive via the common channel in dependence with the selected option.

According to a further aspect of the invention, there is provided a telecommunication system in which at least one service is provided to a user, said system comprising:

means for transmitting information to said user;

means for determining the amount of information received by said user; and means for charging said user in dependence on the amount of information received by said user.

According to a further aspect of the invention, there is provided a telecommunication system in which at least one service is provided to a user comprising:

means for allowing a user to pay in advance to receive a predetermined amount of information;

means for transmitting information to a user; and means for preventing said user from receiving any further information when said user has received said predetermined amount of information.

According to a further aspect of the invention, there is provided a telecommunication system in which at least one service is provided to a user comprising means for allowing a user to subscribe to receive information in accordance with said service, for predetermined time interval;

means for transmitting information to a user; and means for preventing said user from receiving information outside said predetermined time interval.

According to a further aspect of the invention, there is provided user equipment for use in a telecommunication system, said user equipment comprising:

means for receiving information;

means for determining the amount of information received; and means for transmitting information on the amount of information received.

According to a further aspect of the invention, there is provided user equipment for use in an telecommunication system, said user equipment comprising;

means for receiving information;

means for determining if a predetermined amount of information has been received; and means for preventing said user equipment from receiving any further information if said user equipment has received the predetermined amount of information.

According to a further aspect of the invention, there is provided user equipment for use in an telecommunication system, said user equipment comprising;

means for receiving information in a predetermined time interval;

means for determining if a current time is outside said time interval; and means for preventing said user equipment from receiving any further information if the current time is outside said predetermined time interval

SUMMARY OF DRAWINGS

For a better understanding of the present invention and as to how the same may be carried into effect, reference will now be made by way of example to the accompanying drawings in which.

DESCRIPTION OF PREFERRED EMBODIMENTS

Figure 1:
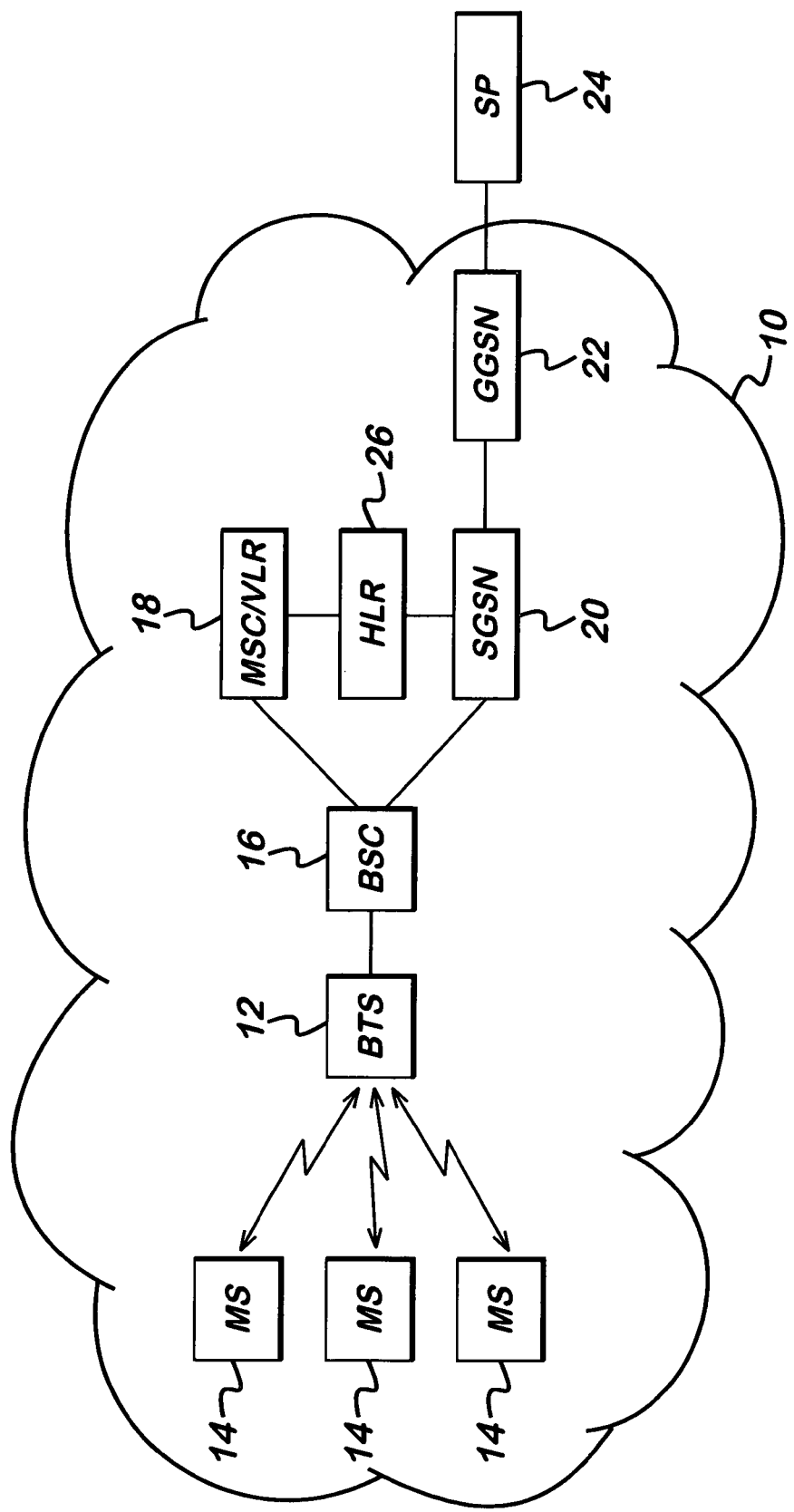
FIG. 1 is a schematic representation of a communication system in which embodiments of the present invention can be implemented.

Reference is made to FIG. 1 which schematically shows a system in which embodiments of the present invention may be implemented. More particularly, FIG. 1 shows a packet switched PLMN 10. In the network, base stations 12 are provided. For illustrative purposes, only one base station is shown. In practice, the area covered by the network is divided into cells each of which is provided with at least one base station. The cells may be neighbouring, overlapping at least partially or fully or have any other appropriate layout. The base station 12 communicates with mobile stations 14 located in the cell associated with the base station or in other cells which are in range of the particular base station. By way of example, three user equipment(s) are shown but in practice there will be many more user equipment(s). The users equipment(s) and base stations communicate via the air interface using radio frequency signals.

The base station is controlled by a radio network controller 16. In practice, the radio network controller 16 may control a number of base stations. In a given network, a number of radio network controllers 16 are provided. The radio network controller 16 is connected to a mobile services switching centre (MSC)/visitor location register VLR 18 and to a SGSN (signalling GPRS support node) 20. The VLR stores location information for a subscriber which is obtained from the subscribers HLR. The MSC/VLR 18 is used for circuit switched communications whilst the SGSN 20 is used for packet based communication. Both the MSG/VLR 18 and SGSN 20 have access to a home location register HLR 26 which stores information relating to the user. For example, the HLR may store information as to the services to which the user has subscribed.

A gateway GPRS signalling node GGSN 22 is provided which gives a gateway to other PLMNs. The gateway 22 may be connected to a service provider 24. The service provider 24 may be external to the PLMN or in alternative embodiments may be part of the PLMN. The services provided 24 will be discussed in more detail hereinafter.

Embodiments of the present invention are particularly applicable to the multimedia broadcast multicast service (MBMS) which is currently specified in Document 3GPPTS22.146. The document is hereby incorporated by reference. Broadcast and multicast are both methods for transmitting datagrams from a single source to several destinations. A cell broadcast service (CBS) which is already defined in the third generation standard proposals 3GPP TS 23.041—technical realization of Cell Broadcast service and TS 25.324 broadcast/multicast control BMC) allows low bit rate data to be transmitted to all subscribers in a given set of cells over a shared broadcast service. This service provides a message-based service and no requirements to charge subscribers receiving this service has be set.

An IP (internet protocol) multicast service is also provided. In some embodiments, multiple users can received the same data at the same time. The advantages of multicast and broadcast is that data is sent once on each link. For example, the SGSN 20 will send data once to the radio network controller 16 regardless of the number of base stations and mobile stations which receive that data. Furthermore, the advantage of multicast or broadcast with respect to the air interface is that many users can receive the same data on a common channel.

In more detail, the broadcast mode is a unidirectional point-to-multipoint transmission of multimedia data, for example text, audio, pictures and videos from a single source entity to all users in a broadcast area or areas. The broadcast area is a geographical area in which the broadcast service is available. The broadcast area may represent the entire PLMN or a subset of it. The broadcast mode transmits the data over common radio channels. An example of the broadcast mode would be advertising or a welcome message to the network. The broadcast mode differs from the multicast mode in that there is no specific requirement to register or subscribe to the broadcast mode of the MBMS. In preferred embodiments of the present invention, the user would not be charged for broadcast data. However, in other embodiments of the present invention, the user may be charged for broadcast data Embodiments of the invention are particularly applicable to the multicast mode. However alternative embodiments of the invention are applicable to the broadcast mode.

The multicast mode allows the unidirection point-to-multipoint transmission of multimedia data, for example text, audio, picture and video from a single source point to a multicast group in a multicast area. The multicast area is a geographical area in which the multicast service is available. This may be the entire PLMN, may span several PLMNs or may be a subset of a PLMN. Again, the multicast mode may transmit data over a common radio channel. In the multicast mode, it may be possible for the network to selectively transmit to cells or even parts of cells within the multicast area which contain members of a multicast group. The multicast group is a group of users that are ready to or are receiving multicast traffic transmitted as part of the multicast mode MBMS service. The multicast group is a group of users who have subscribed to a multicast MBMS service and therefore are authorised to activate and receive multicast services associated with this group.

There are a number of different services which can be provided using the multicast mode such as for example, a sports event results service for which a subscription is required. In preferred embodiments of the present invention, the multicast mode generally requires a subscription to the multicast group and then activation of the service. Different users can subscribe to different ones of said service.

Embodiments of the present invention are particularly concerned with charging or multicast services.

The parameters that an operator can take into account when deriving specific subscribers MBMS charging can take into account at least one of the following: the traffic volume per service received by the subscriber. This may be measured at the subscriber's side. It should be appreciated that the subscriber is in practice the mobile station, or any other user equipment.

Another parameter which can be taken into account is the number of services that a specific user equipment or user is simultaneously subscribed to. This can have an impact on the price. For example, the more services that the user subscribes to the cheaper that each individual service becomes.

A subscriber can receive multicast data inside the multicast service area using point-to-multipoint link. However, if the subscriber moves out of the multicast service area then the operator can continue to provide multicast services but with point-to-point links In embodiments of the invention the information that some subscribers might wish (or could be forced by the operator) to offer to the operator on whether they (subscribers) do not want to be able to receive multicast data outside the multicast service area is used. This means the following.

1. If a subscriber informs the operator that he/she does not wish to receive multicast data outside multicast service areas (which are known to the potential subscriber prior to the subscription, so he/she can make a decision) then: subscriber cannot not receive multicast data outside the multicast service. Since this information can benefit the operator (because operator builds a "profile" regarding the expected multicast behaviour of the subscriber which is useful in cell/network planning, it is expected that, in some but not necessarily all embodiments of the invention, the subscriber will get better charging rates i.e. lower multicast charging costs).
2. On the other hand if a subscriber decide to ignore this option (and decide on unlimited reception of multicast data independently of the area), then he/she is able to receive multicast data either inside the multicast service area (with point to-multipoint links) or outside it via point-to-point dedicated links. This subscriber is expected, in some but not necessarily all embodiments of the invention, to be charged more cause it has an "unpredictable" behaviour.

Thus, in one embodiment of the present invention, it is proposed that the user should be given the option (or be forced) to choose in advance, for example, at the beginning of the month during the multicast subscription phase, if he/she wants to be able to use a particular service or a group of services in areas where multicast is not normally provided. In other words, this would provide the user with the information which would otherwise normally be sent by point-to-multipoint but if the user is in a non-multicast area, this requires a point-to-point link. This contrasts with the normal multicast service where there is a single point-to-multipoint link.

If the user chooses this option, then the user would be allowed to initiate and receive MBMS data when in any non-multicast service area.

This also means that if the subscriber is moving, the subscriber can be handed over to cells outside the multicast service area and continue to receive the multicast data.

If a subscriber does not subscribe to this option, then the subscriber will not be allowed to hand over outside any multicast service area. This means that sessions will be terminated as soon as a subscriber passes out of a multicast service area. This also means that the user, if not subscribing to this option, will not be able to receive multicast data outside the multicast area.

If a particular subscriber's location information is stored in the appropriate core network MBMS entity together with the subscriber's information indicate that the subscriber is out of the multicast service area, this information could be indicated directly to the GGSN 22. The GGSN 22 may provide the copying of the MBMS data to different multicast related GTP (GPRS Transport Protocol) pipes. This is the protocol used in GPRS for transmitting user data packets and signalling between GPRS support nodes over the GPRS backbone network. This copy of the data would then start the normal procedures to establish a normal point-to-point connection between the user equipment and the network. It should be appreciated that in this way the MBMS data transmission would be transparent to the UTRAN and the only node that would know that this data is actually MBMS data is the GGSN node.

In embodiments of the present invention, the GGSN could indicate to the charging unit of the service provider or operator as the case may be that the fee of the connection is higher as a result of the point-to-point connection of the MBMS services.

It is expected that the service traffic will vary dynamically with time leading to congestion during certain time intervals. Some subscribers of some multicast services may wish to receive those services independently of the congestion at real time or as close to real time as possible whilst others might not mind whether or not the services are real time. Therefore, in some embodiments of the present invention, the network operator/service provider will provide this option to potential subscribers by offering a prioritised version of the these.services. For example, video clips can be converted to streaming types of data to provide a more real time service. The subscribers will receive data only once independently of whether they are registered for the "real time" option on not.

In this way, the operator is able to offer the subscriber quality of service, in terms of priority, during certain times. It is of course envisaged that the subscriber be charged accordingly for these differing versions of the same service.

The user could be charged for the amount of multicast data or the like received. In this regard, reference is made to FIG. 2 which shows schematically a mobile station or other user equipment embodying the present invention. The mobile station 50 has an antenna 52 which is arranged to receive multicast signals and also to transmit signals. As mentioned previously, the mobile station 50 is in communication with one or more base stations. The mobile station 50 has receive circuitry 54. This receive circuitry takes the received radio frequency signal, amplifies it, filters it and reduces is to a base band frequency. Furthermore, the receive circuitry 54 is arranged to convert the analogue signal to a digital signal. The received digital signal is input to a digital signal processor 56 which performs various functions with respect to that data so that it can be read, heard etc by the user. The user equipment includes a data counter 58. This data counter can be provided in software, and may be arranged in any suitable part of the user equipment. The data counter is arranged to determine the amount of MBMS data which is received by the mobile station. Alternatively of additionally the counter may use time (i.e. how long the user equipment UE is receiving multicast related data from the air interface). In both cases the unit is a countable value from UE point of view. It should be appreciated that the UE is able to identify MBMS data. Using that identification, the number of bytes (PDUs), times etc received can be counted.

The mobile station 50 also has a transmit circuitry 60 which is arranged to transmit signals received from the digital signal processor. In particular, the transmit circuitry 60 converts the signal from a digital form to an analogue form, up converts the signal from the base band frequency to the radio frequency and provides it at an appropriate power to the antenna 52 for transmission. Information which can be transmitted by the transmit circuitry includes the amount of data counted by the data counter 58. The counted time or amount of data received by the user can then be forwarded to the charging entity of the service provider 24 or network operator. Based on this information, a calculation can be made as to the amount that a user is to be charged for the duration (usage) of a particular service.

The time/data count information can be sent to the network in a number of different ways. In one embodiment of the present invention, a core network level signalling message can be defined which includes that information. In alternative embodiments of the present invention, information can be included in an already defined core network signalling messaging. For example, this information could be sent in a service request message, a routing area update request, LA/RA (location area/routing area) update messages. Alternatively or additionally, this information can be sent to the network using any new or existing radio resource control (RRC) message which may trigger the transmission of a new or existing radio access network application part (RANAP) message on the Iu interface in order to get charging related information also to the CN side. In the case where an already defined RRC message is used, that message may be for example a cell update/URA (UTRAN Registration Area: One URA area can consist of number of cells and in 3G this area definition is transparent to the CN) update message, an RRC connection request etc.

It should be appreciated that in some embodiments of the present invention sending the charging information back to the network is not particularly time critical. Accordingly, the need to generate a feedback channel especially for this purpose from each mobile station at the end of an MBMS multicast session is not required, However, in some embodiments of the present invention this may be done.

In preferred embodiments of the present invention, it is preferred to send the charging information when the user equipment is connected to the network and there are ciphering keys in place for the transmission of data from the user equipment to the base station.

If the user equipment is in the idle mode, that is there is no RRC connection on the UTRAN side but there is a mobility management context on the core network side, after the user equipment has requested the RRC connection and the network has configured the required dedicated control channel for the user equipment, the charging information can be sent. This can be done due to a mobile originated call or for another reason, for example for a routing area (RA) update procedure. Alternatively or additionally, the information can be sent when the user equipment is paged. In particular, the information can be included in the paging response sent by the mobile station. Alternatively or additionally, the information can be sent when the user equipment performs the routing area update procedure.

When the user equipment is in the RRC connected mode, the information can be sent in one or more of the following ways: the information can be sent through existing dedicated control channel. The RRC state can either be the cell—FACH Forward Access Channel state, in this state the UE can use only common channels like RACH/FACH, or the cell—DCH Dedicated Channel state, in this state for the UE the can be reserved a dedicated channels like DCH, or it can use shared channels like DSCH. state This is defined in the third generation specification 3GPP TS 25.331. The charging information can be sent when the user equipment performs a cell update or a URA update. In this case the RRC state is either the cell—PCH Paging Channel state, (in this case the UE informs the network each time the UE enters into a new cell. In this way the network knows the location of the UE on a cell basis) or URA—PCH state (in this state the UE informs the network of its location when it enters a new URA area. I.e. in this state the UEs location is not know on cell basis and therefore there is a need to page the UE. This paging message has to be sent to more than one cell.). Alternatively or additionally, the user equipment can provide the charging information when the routing area update procedure is performed.

In the alternative or as a backup to any of the above described procedures, it is possible to define a periodic charging procedure in contrast to the event driven procedures lists hereinbefore. This means that if no calls are made to or from the user equipment and the user equipment does not move, for example, from one cell to another, the user equipment can automatically enter a charging procedure in which the user equipment sends the charging records to the network. This can be done by establishing an RRC connection, which is a secure method or by using the same methods and channels which are used to send RA/cell/URA update messages.

If an operator or service provider does not receive charging information from predetermined user equipment, the operator or service provider may send either a new configuration message to the user equipment in which the receiving or MBMS multicast service is disabled. Alternatively or additionally, the service provider or operator can periodically update the required parameters of the service so that all those user equipment from which no charging information has not been received, will no longer be enabled to receive the corresponding MBMS multicast service as the user equipment will no longer have the correct configuration parameters.

In preferred embodiments of the present invention, it may be possible to mark or identify user equipment which are not used in relation to MBMS services for predetermined time. These user equipment may not even have the mobility management context at the network side. This marking or identification can be stored in the HLR 26 so that the next time the user equipment is turned on and tries to make either the IMSI or GPRS attachment to the network, the user equipment is reconfigured after a certain period if no charge information is still not received from the, user equipment.

Figure 3:
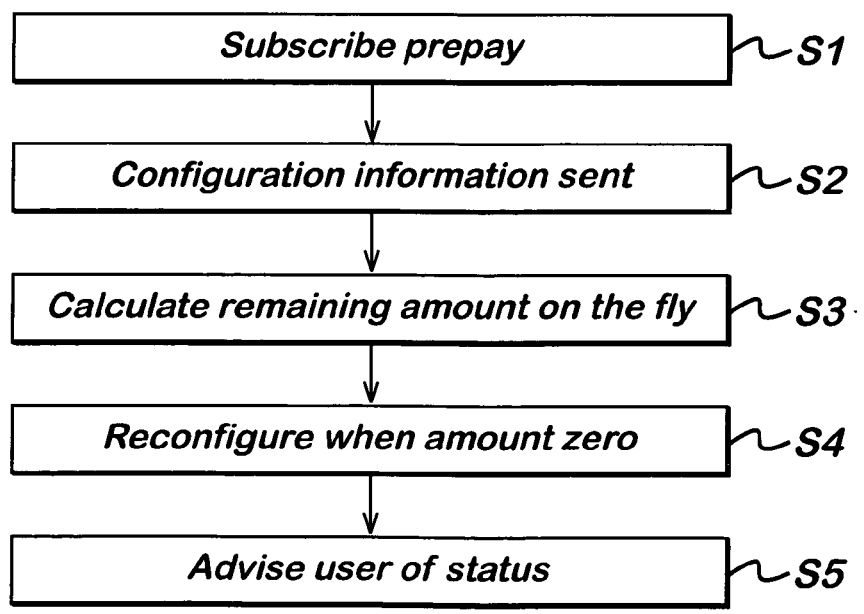
FIG. 3 shows a flow diagram of a method embodying the present invention.

In some embodiments of the present invention, it is proposed to provide a pre-paid subscription option for the user. This is described in relation to the flow chart of FIG. 3. In particular, the user will be able to make a pre-paid service agreement in step S1 with an operator or service provider for one or more MBMS multicast services. It should be appreciated that in some embodiments of the present invention, the MBMS services may be divided into one or more groups. Once an agreement has been made, the configuration information that allows the user to receive the required MBMS multicast data is sent in step S2 to the user equipment along with other configuration information such an encryption related parameters and so on. The configuration information may, but not necessarily, include the pre-paid fee amount per service type, service identity or group. Based on the received configuration information the user equipment is able to determine what kind of services it can receive and which services or group of services are pre-paid or not. Thus, in some embodiments of the present invention, the user is able to receive only services for which a pre-payment has been made. Alternatively, there will be some services for which the user has pre-paid and others for which the user pays on receipt of a bill (monthly subscription) or the like.

Figure 2:
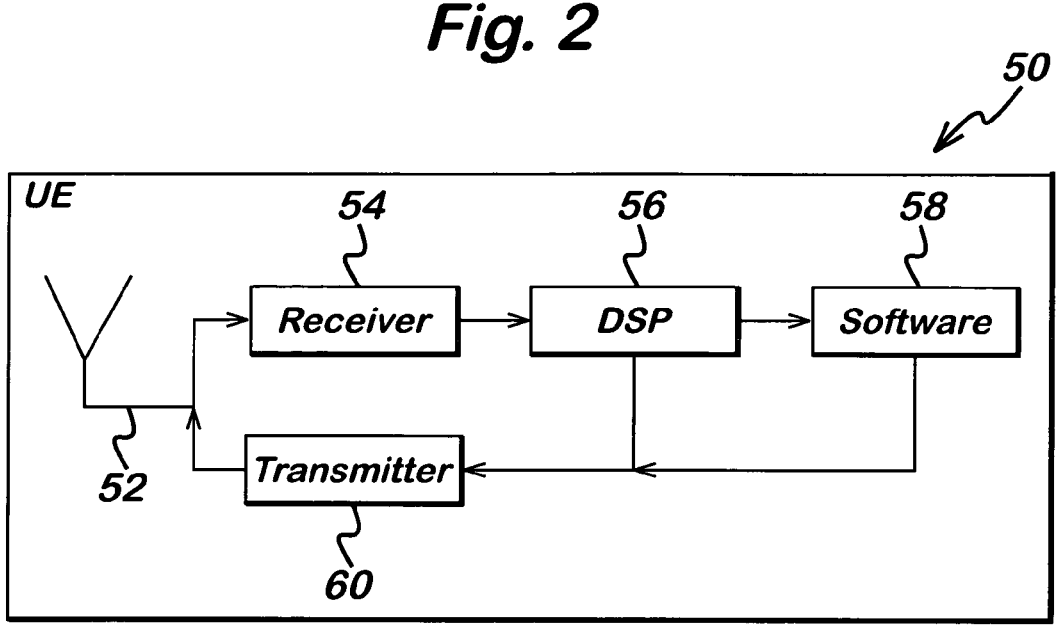
FIG. 2 is a schematic representation of a mobile station embodying the invention.

The user equipment in this embodiment is arranged in step S3 to calculate the amount of received data, in the same or similar way described in relation to FIG. 2 and updates a counter to the remaining pre-paid amount that can still be received. In practice this means decrementing the current stored amount. When the counter shows that no more data can be accepted, ie the counter is at zero or thereabouts, the user equipment is arranged in step S4 to disable to service configuration. This can be achieved for example by causing the user equipment to delete the service number from the user equipment data base, to disable the ciphering unit etc. The user equipment may then be arranged to provide an indication to the user of the current status of the service. The subscriber can then refresh the service either by paying a further amount as a pre-pay option or by changing the basis on which the user is charged. Once the user has subscribed again, then the user receives the necessary configuration information which can be stored in any suitable location such that the subscriber does not have access to this information.

It should be appreciated that in alternative embodiments of the present invention, the network operator or service provider may determine the remaining amount in dependence on information received from the user equipment as to the amount of information received.

In embodiments of the present invention, a "pay per view" type service option may be available. The user equipment can be either an existing MBMS subscriber or not. However the activation de-activation of such multicast session is controlled by the service provider or operator. In this embodiment, the user equipment is able to buy access to certain MBMS multicast data services that are activated/transmitted during specific times. The fee may correspond to the maximum data load the user equipment can receive in a pay per view session. The user can either pay on the basis of a flat fee or on the basis of an amount which corresponds to the actual amount of data received. In the latter case information relating to how much data is received by the user equipment is sent to the network as previously described.

The pay per view may be a pre-paid option or the user may be subsequently billed. It should be appreciated that in the pay per view option, the user has no choice regarding the time during which it uses the service.

The ciphering keys that are sent to the user equipment for the pay per view event may have a specific duration such that the user is unable to receive data after the end of the event. The keys could also be a function of the amount of data received. The keys would then expire either when the maximum amount of data is received or when the end of the pay per view session is reached.

It should be appreciated that preferred embodiments of the present invention have been described particularly in relation to an MBMS service. It should be appreciated of the present invention are equally applicable to any other similar service. It should be appreciated that embodiments of the present invention can be implemented in any suitable standard or network.

The invention claimed is:

1. A method for providing a service to a user comprising the steps of:
   defining an area in which said service is available;
   transmitting information to a plurality of users in said area the same time via a common channel; and
   determining if a user is in said area and if said user is in said area, said user being arranged to receive said information transmitted on said common channel, wherein if said user is outside said area, said user being provided with an option of receiving said information via a dedicated channel or the option of not receiving said information, said user being charged for the information received via the common channel in dependence with the selected option.

2. A method as claimed in claim 1, wherein said common channel comprises a radio channel.

3. A method as claimed in claim 1, comprising the step of handing off said user when the user moves between said area and outside said area.

4. A method as claimed in claim 1, comprising the step of determining if said user is permitted to receive said information if said user is outside said area and only providing said user with said information outside said area if said user is permitted to receive said information.

5. A method as claimed in claim 1, comprising the steps of:
transmitting information to said user;
determining an amount of information received by said user; and
charging said user in dependence on the amount of information received by said user.

6. A method as claimed in claim 5, wherein said amount of information received by said user is determined by said user.

7. A method as claimed in claim 5, comprising the step of sending information relating to the amount of information received to a charging entity associated with said service.

8. A method as claimed in claim 5, wherein information on the amount of information received is sent to a network in one or more of the following messages:
core network level signalling message; radio resource control message; paging response message; routing update message; dedicated control channel; cell update message; URA update message; and routing area update message.

9. A method as claimed in claim 5, wherein information on the amount of information received is sent to a network via an encrypted connection.

10. A method as claimed in claim 5, wherein information on the amount of information received is sent periodically to a network.

11. A method as claimed in claim 5, comprising the step of preventing said user from receiving information if information on the amount of information received has not been received for a predetermined period of time.

12. A method as claimed in claim 11, wherein said step of preventing said user comprises reconfiguring said user.

13. A method as claimed in claim 11, wherein said step of preventing said user comprises updating the configuration parameters required by users to obtain said service without providing said updated configuration parameters to said prevented user.

14. A method as claimed in claim 5, wherein said user is charged in dependence on the number of services to which the user subscribes.

15. A method as claimed in claim 5, comprising the step of charging said user for the service in dependence on the quality of service provided to the user.

16. A method as claimed in claim 1, comprising the steps of:
paying in advance to receive a predetermined amount of information;
transmitting information to a user;
determining the amount of information received by said user; and
preventing said user from receiving any further information when said user has received said predetermined amount of information.

17. A method as claimed in claim 16, wherein said step of preventing said user comprises reconfiguring said user.

18. A method as claimed in claim 16, wherein said step of preventing said user comprises updating the configuration parameters required by users to obtain said service without providing said updated configuration parameters to said prevented user.

19. A method as claimed in claim 16, wherein said amount of information received by said user is determined by said user.

20. A method as claimed in claim 16, comprising the step of sending information relating to the amount of information received to a charging entity associated with said service.

21. A method as claimed in claim 16, wherein information on the amount of information received is sent to a network in one or more of the following messages:
core network level signalling message; radio resource control message; paging response message; routing update message; dedicated control channel; cell update message; URA update message; and routing area update message.

22. A method as claimed in claim 16, wherein information on the amount of information received is sent to a network via an encrypted connection.

23. A method as claimed in claim 16, wherein information on the amount of information received is sent periodically to a network.

24. A method as claimed in claim 1, comprising the steps of:
subscribing to receive information in accordance with said service, for a predetermined time;
transmitting information to a user; and
preventing said user from receiving information outside said predetermined time.

25. A method as claimed in claim 24, wherein said preventing step comprises changing the configuration of said user.

26. A method as claimed in claim 24, wherein said service is a multicast service.

27. A method as claimed in claim 24, wherein said service is a multicast broadcast multimedia service.

28. A method as claimed in claim 24, wherein said user is user equipment.

29. A method as claimed in claim 28, wherein said user equipment comprises a mobile station.

30. A method as claimed in claim 24, wherein said method is provided in a wireless telecommunications network.

31. A method as claimed in claim 1, comprising the step of charging said user for the service in dependence on the quality of service provided to the user.

32. A method as claimed in claim 31, wherein said quality of service is either substantially real time or non real time.

33. A method as claimed in claim 32, wherein said information is transmitted once at substantially real time or once at non-real time.

34. A method as claimed in claim 1, comprising the steps of:
subscribing to receive information with one of at least two different quality of service;
transmitting substantially the same information with each of said different qualities of service; and
receiving said information at said user with the quality of service for which the user has subscribed.

35. A method as claimed in claim 34, wherein at least one of said quality of service is a real time service and at least one of said quality of service is a non real time service.

36. A method as claimed in claim 34, comprising the step of storing information relating to a users expected multicast behaviour.

37. A method as claimed in claim 1, further comprising:
charging said user for said information received via said common channel when the user is in said area.

38. A telecommunications system in which a service is provided to at least one user, said system comprising:
a first area in which said service is available and a second area in which said area is not available;
means for determining if a user is in said first area or said second area;
means for transmitting information to a plurality of users in said first area at the same time via a common channel, wherein if a user is outside said area, said user being provided with an option of receiving said information via a dedicated channel or the option of not receiving said information; and
charging means arranged to charge said user for the information in dependence with the selected option.

39. A system as claimed in claim 38 in which at least one service is provided to a user, said system comprising:
means for transmitting information to said user;
means for determining an amount of information received by said user; and
means for charging said user in dependence on the amount of information received by said user.

40. A system as claimed in claim 38 in which at least one service is provided to a user comprising:
means for allowing a user to pay in advance to receive a predetermined amount of information;
means for transmitting information to a user;
means for determining the amount of information received by said user; and
means for preventing said user from receiving any further information when said user has received said predetermined amount of information.

41. A system as claimed in claim 38 in which at least one service is provided to a user comprising:
means for allowing a user to subscribe to receive information in accordance with said service, for predetermined time interval;
means for transmitting information to a user; and
means for preventing said user from receiving information outside said predetermined time interval.

42. A method as claimed in claim 1, wherein said user is charged in dependence on the number of services to which the user subscribes.

* * * * *